(12) United States Patent
Mohammad

(10) Patent No.: US 7,517,402 B2
(45) Date of Patent: Apr. 14, 2009

(54) COMPOSITION COMPRISING A PHOSPHATE BINDER AND ITS PREPARATION

(75) Inventor: Pakiza Mohammad, Brussels (BE)

(73) Assignee: Xexos Ltd., Dublin (IE)

( * ) Notice: Subject to any disclaimer, the term of this patent is extended or adjusted under 35 U.S.C. 154(b) by 980 days.

(21) Appl. No.: 10/821,154

(22) Filed: Apr. 7, 2004

(65) Prior Publication Data

US 2004/0234595 A1    Nov. 25, 2004

Related U.S. Application Data

(63) Continuation-in-part of application No. PCT/BE01/00174, filed on Oct. 8, 2001.

(30) Foreign Application Priority Data

Jul. 7, 2003    (BE)    .................... PCT/BE03/00121

(51) Int. Cl.
    C04B 14/00    (2006.01)
(52) U.S. Cl. ..................... 106/400; 106/38.3; 106/38.9; 164/522; 164/524; 424/465
(58) Field of Classification Search ................ 106/38.3, 106/38.9, 400
    See application file for complete search history.

(56) References Cited

U.S. PATENT DOCUMENTS

| | | |
|---|---|---|
| 2,687,967 A | 8/1954 | Yedlick et al. |
| 2,992,930 A | 7/1961 | Wheeler et al. |
| 3,179,527 A | 4/1965 | Vukasovich et al. |
| 3,830,173 A | 8/1974 | Hubble et al. |
| 4,375,516 A | 3/1983 | Barrall |
| 4,504,555 A | 3/1985 | Prior et al. |
| 4,642,137 A | 2/1987 | Heitzmann et al. |
| 4,792,359 A | 12/1988 | Barrall et al. |
| 4,872,912 A | 10/1989 | Barrall et al. |
| 6,139,619 A | 10/2000 | Zaretskiy et al. |
| 2002/0009622 A1 | 1/2002 | Goodson |
| 2004/0072487 A1 | 4/2004 | Neumann et al. |

FOREIGN PATENT DOCUMENTS

| | | |
|---|---|---|
| DE | 2 038 290 | 2/1971 |
| EP | 0142715 | 5/1985 |
| EP | 0 417 583 | 3/1991 |
| EP | 0 507 463 | 10/1992 |
| EP | 0616987 A2 | 9/1994 |
| EP | 1236566 | 2/2002 |
| GB | 2155402 A | 9/1985 |
| WO | WO 93/21126 | 10/1993 |
| WO | WO 99/03797 | 1/1999 |
| WO | WO 00/24690 | 5/2000 |
| WO | WO 03/031366 A1 | 4/2003 |

OTHER PUBLICATIONS

PCT International Preliminary Report on Patentability PCT/BE2004/000100; Mohammad, Pakiza.
PCT International Search Report PCT/BE2004/000100; Mohammad, Pakiza.

*Primary Examiner*—Jerry Lorengo
*Assistant Examiner*—Pegah Parvini
(74) *Attorney, Agent, or Firm*—Hovey Williams LLP

(57) ABSTRACT

A binder, a composition, a product and a kit, as well as a process for preparing the binder and composition, are directed to a composition useful as an inorganic phosphate binder, which binder is characterized as having calcium silicate sites which are connected the one with the other by alumina-silica phosphate bonds, and a filler.

111 Claims, No Drawings

COMPOSITION COMPRISING A PHOSPHATE BINDER AND ITS PREPARATION

The present application is a continuation in part application of International Application No. PCT/BE01/00174, with an International filing date of Oct. 8, 2001, published in English under PCT Article 21(2), this continuation in part application further claiming the benefit of priority of International Application No. PCT/BE03/00121 filed on Jul. 7, 2003, which designates the United States and at least one other country.

FIELD OF THE INVENTION

The present invention relates to a composition comprising an inorganic binder, most precisely to an inorganic phosphate binder.

THE PRIOR ART

Inorganic phosphate binder have already been proposed in the past.

For example in a previous patent application WO9903797 in the name of Metal Chemical and Haji Anas, a polymeric matrix is disclosed, said matrix comprising a binder formed by mixing an alkali metal silicate aqueous solution with a powder comprising silico-aluminous reactive raw materials. A polymerization time of more than one hour is however necessary for reaching a sufficient hardening of the matrix.

It has also been proposed in U.S. Pat. No. 6,139,619 to form a binder by mixing a water soluble silicate with a water soluble amorphous inorganic phosphate glass in an aqueous medium. The hardening of the binder requires the removal of water by a heat treatment.

In U.S. Pat. No. 4,375,551, an acid solution is prepared by mixing $Al_2O_3.3H_2O$ with phosphoric acid, said acid solution being then mixed with calcium silicate. The so obtained binder has after hardening poor mechanical strength.

U.S. Pat. No. 4,504,555 discloses an inorganic resin formed by reacting a first liquid component containing a mono aluminum phosphate or a mono magnesium phosphate, with a second liquid component containing magnesium oxide and/or wollastonite and a dispersing agent. Inert filler can be added to the first or second component. The inert filler (particles not participating to the reaction) can be $SiO_2$ particles. The product prepared by this reaction is a resin in which adjacent calcium silicate sites (wollastonite) bound by magnesium/aluminum phosphate bonds, not by alumina silica phosphate bonds.

U.S. Pat. No. 3,179,527 discloses a coating composition formulated by adding silica or lime to an acidic solution of aluminum phosphate. Calcium silicate is then added to the composition. As stated in column 2 of said patent, the effect of added silica depends from the particle size of the silica particles, fine silica particles forming open cracks, while coarser particles do not produce such cracks. The silica particles are therefore not dissolved, otherwise the particle size of the silica particle would have no influence on cracks. The silica is therefore used in this patent as filler. The use of silica in a prereacted composition is even not indispensable according to said patent, as it could be replaced by calcium silicate. Silica is therefore not participating in the formation of bond between two adjacent calcium silicate particles. The compositions of this patent have a long shelf stability, meaning that the hardening reaction is a slow process.

The present invention has for subject matter a binder which can be sufficiently hardened within a term of less than 10 minutes and which has excellent mechanical properties. The inorganic binder of the invention is characterized by calcium silicate sites connected the one to the other by alumina-silica phosphate bonds.

DESCRIPTION OF THE INVENTION

The Binder

The inorganic binder of the invention is characterized by calcium silicate sites which are connected the one with the other by alumina-silica phosphate bonds.

Advantageously, the calcium silicate sites are calcium meta silicate sites having a substantially acicular nature with a length/diameter ratio from 2/1 to 50/1, advantageously from 3/1 to 20/1.

Preferably, the calcium meta silicate sites has an average length from 10 μm to 10 mm, advantageously from 50 μm to 5 mm.

The calcium silicate sites act preferably as cross-linking sites for alumina-silica phosphate bonds.

According to an embodiment, the alumina-silica phosphate bonds have a weight ratio $Al_2O_3/SiO_2$ ranging from 0.3:1 and 10:1, advantageously from 0.6:1 and 6:1.

According to an advantageously embodiment, the weight ratio calcium silicate sites/alumina-silica phosphate bonds is comprised between 0.1 and 1.1, advantageously between 0.3 and 0.9, preferably between 0.4 and 0.7.

The binder of the invention is suitable for preparing product having a light weight (such a weight from 70 to 140 $kg/m^3$) or a heavy weight (such as weight of 2,000 $kg/m^3$ or even more). Products of the invention have high mechanical properties, such as compression strength of more than 40N/$mm^2$, bending strength of more than 10 $N/mm^2$, etc.

The invention relates also to a composition and a product comprising at least a binder according to the invention and at least one filler and/or reinforced material.

Compositions of the Invention

The compositions of the invention are composition before hardening, after hardening, possibly after an after treatment, such as a drying step, a heating step, etc.

Compositions of the inventions are compositions comprising at least a binder of the invention, and one or more fillers, inert fillers with the binder.

The composition of the invention comprising at least:
an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 to 10:1, advantageously from 0.6:1 to 6:1, and
a filler.

Examples of fillers or reinforced materials which can be mixed with the binder before its preparation, during its preparation, before its hardening or during its hardening are:
waste materials, such as finely divided waste material, for example fuel ashes, fly ashes, buildings waste materials, etc.
flake-like materials such as mica, etc.,
silica sand, silica flour,
coloring agents or materials, such as inorganic coloring agents, pigments, etc.
cellulose and/or protein base fibers, such as natural fibers, flax, chip, straw, hemp, wool fibers, etc.
synthetic fibers, such as organic synthetic fibers, inorganic synthetic fibers, such as polyesters, polypropylene, glass and ceramic fibers, etc.

natural and synthetic organic base waste materials, such as saw dust, rice husk, straw and recycled organic waste,
natural fibers of mineral origin,
natural material, possibly treated (for example heat treated), such as perlite, vermiculite, etc.
etc.
mixtures of one or more of the above fillers.

Specific examples of possible fillers are:
rice husk,
waste recycle cardboard
shredded paper
rice husk/shredded paper composite
rice husk+waste recycle cardboard
pine needle
laminated elements, such as honeycomb board, normal cardboard, etc.
pigments Additives can be added to the binder before its preparation, during its preparation, before its hardening or during its hardening, such additives are for example:
foaming agents, such as water peroxide, organic peroxide, etc.
viscosity regulating agent, such as superplasticizer
material for improving the impermeability or the water repulsion such as lignosulfonates and silica fume
etc.

According to an embodiment, substantially all calcium silicate sites of the inorganic binder are bound the one to the other by alumina-silica phosphate bonds.

According to a specific embodiment, the weight ratio calcium silicate site/$SiO_2$ present in the alumina-silica phosphate bonds of the inorganic binder is greater than 1, advantageously greater than 1.5, such as 2, 3, 4, 5 or even more.

The calcium silicate particles are advantageously calcium meta silicate particles having a substantially acicular nature with a length/diameter ratio from 2/1 to 50/1, advantageously from 3/1 to 20/1.

The calcium meta silicate particles have preferably an average length from 10 µm to 10 mm, advantageously from 50 µm to 5 mm, such as 100 µm, 300 µm, 500 µm, etc.

According to a preferred embodiment, the calcium silicate particles act as cross-linking sites for alumina-silica phosphate bonds. It seems also that the presence of insoluble calcium silicate particles catalyzes the formation of alumina-silica phosphate bonds.

For example, the weight ratio calcium silicate particles/alumina-silica phosphate solution is comprised between 0.1 and 1.1, preferably from 0.3 and 0.9, most preferably between 0.4 and 0.7.

Preferably, the composition comprises at least a silicon containing filler, most preferably silicon containing fibers with a length of less than 1000 µm. The weight content of silicon containing fibers with a length of less than 1000 µm in the composition after its hardening and after removal of the possible free water is advantageously at least 0.5%. The silica containing fillers, especially fibers, are advantageously treated with a water repellent agent, such as a water repellent coating of less than 10 µm. This coating is for example a fluoro silane coating.

It has now further been observed that by using specific filler, especially a combination of specific fillers, it was possible to increase mechanical properties of the mixture binder/filler(s) and/or the final appearance of the composition after its hardening and/or the fire resistance of the composition. For example, it was observed that swelling of the product could be reduced or prevented after a water absorption.

The invention relates thus also to a composition comprising at least:
an inorganic binder having calcium silicate sites which are connected the one with the other by alumina-silica phosphate bonds, the calcium silicate sites acting as cross-linking sites for alumina-silica phosphate bonds with a weight ratio $Al_2O_3/SiO_2$ ranging advantageously from 0.3:1 and 10:1, preferably from 0.6:1 and 6:1, and
silicon containing fibers with a length of less than 1000 µm, the weight content of silicon containing fibers with a length of less than 1000 µm in the composition after its hardening and after removal of the possible free water being of at least 0.5% (i.e. a dry weight content).

It has been observed that the presence of at least 0.5% by weight, preferably at least 1% by weight of silicon containing fibers, advantageously silicon containing fibers non reactive with the binder or substantially non reactive with the binder, it was possible to prevent the formation of any cracks at the surface of the hardened composition, as well as advantageously in the body of the hardened composition, even if the hardened composition has a high thickness, such as a thickness of more than 2 mm, advantageously of more than 5 mm, such as a thickness comprised between 10 mm and 50 mm.

Advantageously, the composition comprises silicon containing fibers with an average (in weight) length of less than 500 µm, the weight content of silicon containing fibers with an average length of less than 500 µm in the composition after its hardening and after removal of the possible free water (free water is water present in the composition, such as in the hardened composition, but which can be removed in a drying step at a temperature of 100° C.) being of at least 0.5% (i.e. a dry weight content).

According to a preferred embodiment, the composition comprises silicon containing fibers with an average (in weight) length of more than 10 µm, advantageously of more than 20 µm, preferably comprised between 25 µm and 300 µm, most preferably between 50 µm and 250 µm.

According to an advantageous embodiment, the silicon containing fibers with a length of less than 1000 µm, advantageously with an average (in weight) length of less than 500 µm, are substantially not reactive with the binder, preferably not reactive with the binder, i.e. acting as a pure filler. Substantially not reactive silicon containing fibers are fibers characterized in that less than 10% by weight, advantageously less than 5% by weight, preferably less than 1% by weight, most preferably less than 0.5% by weight, of the silicon containing fibers is chemically reacted with the binder, for making for example one or more chemical bonds between fibers and the binder.

According to embodiments, after hardening and removal of free water, the composition comprises from 1% up to 75% by weight, advantageously from 2% up to 25% by weight, silicon containing fibers with a length of less than 1000 µm, advantageously with an average (in weight) length of less than 500 µm.

Silica containing fibers are for example natural fibers, possibly treated, synthetic fibers, mineral fibers, and mixtures thereof. Natural fibers are preferred, such as wood fiber, straw fiber, rice husk or bran fibers, mixtures thereof. The natural fibers are advantageously heat treated, for example at temperature higher than 400° C., such as at a temperature higher than 700° C. or 800° C., advantageously in an atmosphere rich in Nitrogen or in a nitrogen atmosphere. Said heat treatment is preferably carried after a drying step. Rice bran or rice husk are preferred silica containing fibers used in the composition of the invention, said fibers being advantageously defatted and dried. When said fibers are burned and carbonized in a nitrogen gas rice bran ceramic fiber are produced. Possibly some phenolic resin is added to the rice bran or rice husk before the carbonizing and burning step. Possibly the phenolic resin can be mixed with rice bran so as to prepare or form rice bran containing fibers or filaments, the latter fibers or filament after drying being carbonized and burnt (for example at a temperature of 300 to 1100° C. during a time sufficient for the formation of ceramics). The silica containing fibers are advantageously ceramic silica containing fibers. Such fibers, especially rice bran ceramic fibers, have a high strength, a high hardness, a low density, a low friction (hereby the fibers can easily flow the one with respect to the other, whereby facilitating the mixing step).

Silica containing fibers are advantageously treated with a water repellent agent, such as a water repellent coating of less than 10 µm. This coating is for example a fluoro silane coating.

According to a preferred embodiment, the composition further comprises silica flour with a particle size of less than 500 µm, advantageously comprised between 2 and 400 µm, the weight content of silica flour in the composition after its hardening and after removal of the possible free water being of at least 0.5%. Said silica flour content is advantageously comprised between 1 and 10% by weight of the composition after its hardening and removal of free water (water which can be removed with a heating step at a temperature of 100° C.) (i.e. a dry weight content).

Preferably, the composition comprises silica flour with an average (in weight) particle size comprised between 2 and 100 µm, advantageously between 5 and 60 µm, preferably between 10 and 50 µm, the weight content of silica flour in the composition after its hardening and after removal of the possible free water being comprised between 1 and 10%, advantageously between 2 and 8%.

According to a more specific embodiment, the composition with or without (advantageously with) silica flour further comprises crystallized alumina silicate particles which are substantially not reactive with the binder and which have an average (in weight) particle size comprised between 5 and 100 µm, the weight content of crystallized alumina silicate in the composition after its hardening and after removal of the possible free water being comprised between 1 and 10%, advantageously between 2 and 8%.

According to an advantageous embodiment, the weight ratio calcium silicate site/$SiO_2$ present in the alumina-silica phosphate bonds is greater than 1, preferably greater than 1.5.

Advantageously, the calcium silicate sites are calcium meta silicate sites having a substantially acicular nature with a length/diameter ratio from 2/1 to 50/1, advantageously from 3/1 to 20/1.

Preferably, the calcium meta silicate sites has an average length (average in weight) from 10 µm to 10 mm, advantageously from 50 µm to 5 mm, such as 100 µm, 300 µm, 500 µm.

The calcium silicate sites act preferably as cross-linking sites for alumina-silica phosphate bonds.

According to an embodiment, the alumina-silica phosphate bonds have a ratio $Al_2O_3/SiO_2$ ranging from 0.3:1 and 10:1, advantageously from 0.6:1 and 6:1.

According to an advantageously embodiment, the weight ratio calcium silicate sites/alumina-silica phosphate bonds is comprised between 0.1 and 1.1, advantageously between 0.3 and 0.9, preferably between 0.4 and 0.7.

The composition of the invention can also comprise one or more further filler(s) and/or reinforced materials.

The composition, as well as the binder of the invention can be used for attaching two elements together, i.e. as glue, heat resistant glue or sealant.

Product

The invention relates also to a product comprising at least a hardened layer comprising an inorganic binder of the invention as disclosed hereinabove in the paragraph relating to the binder, but preferably having the composition of the invention as disclosed hereinabove.

The binder/composition of the invention is suitable for preparing product having a light weight (such a weight from 70 to 140 kg/m$^3$) or a heavy weight (such as weight of 2,000 kg/m$^3$ or even more).

Products of the invention have high mechanical properties, such as one or more of the following properties (preferably several of said properties): compression strength of more than 40N/mm$^2$, bending strength of more than 10 N/mm$^2$, very low heat of combustion (less than 500 KJ/kg, advantageously less than 100 KJ/kg, method used: ASTM D 2015 and BS EN ISO 1716), a high modulus of rupture (such as more than 10 MPa, for example between 12 and 20 MPa, method of analysis: NBN EN 196-1), a high compressive strength (more than 50 MPa, such as from 70 to 100 MPa, method of analysis: NBN EN 196-1), a high Young's modulus (more than 500 MPa, such as between 8000 and 15000 MPa, method of analysis: NBN EN 196-1), absence of swelling even for water absorption from 10% up to 30% depending of the porosity, etc.

Products of the invention can be used as insulating materials (as panels, sheets, granules, etc), fire protection material, heat protection material, chemical protection material, buildings material (such as bricks, concrete, etc.), for making molds, shaping, casting and moldings products, tiles, roofing sheet, coating layers, inner layer, laminated products, metallic profile, aluminum profile, steel profile, metal band or plate, flexible membrane, polyethylene web. Polymer layer (polyurethane, latex, etc.), etc. Specific examples are: roofing sheet, insulation panels, coating surface material.

Wear resistant tile, high strength building elements, fire and heat resistant elements, adhesive material, sealants, slates, laminated elements, joint compounds, refractory, mineral fibers, etc.

The invention relates also more precisely to a product made at least partly or associated at least partly to a hardened composition of the invention, as disclosed here above. For example the product can be a support provided with a coating layer with a thickness for example of 1 to 10 mm, or even more.

The product can also have the form of a laminated product, an inner layer being made from a composition of the invention, said inner layer having for example a thickness of 5 mm up to 100 mm, or even more.

According to an embodiment, the hardened layer covers at least partly a face of a support element. One or more faces of the support can be provided with a hardened layer. The thickness of the layer is advantageously lower than 10 mm, such as lower than 5 mm, such as 4 mm, 3 mm, 2 mm, 1 mm, 500 µm, 250 µm, 100 µm, depending on the properties which are required.

According to an advantageous embodiment, the hardened layer covers at least partly a face of a support comprising a core which can be subjected to a water swelling. It has been observed that by coating already one face of a plate (which can be subjected to a water swelling) with a composition of the invention, it was possible to obtain after hardening of the composition, a product which has a reduced swelling even after being dipped in water for 72 hours at 20° C. Tests made on commercial wood fiber composite material with a swelling of 37% after being dipped in water for 72 hours at 20° C., have shown that by providing one or more faces of the material with a thin hardened layer of the composition of the invention, it was possible to reduce the swelling to less than 10%, advantageously less than 6%, preferably less than 2%.

According to a specific embodiment, at least partly a face not covered by a hardened layer of the invention is provided with a water repellent coating, advantageously silicon containing water repellent coating, such as a fluoro silicon coating (fluoro silane, etc. such as fluorosilane marketed by 3M as water repellent agent, such as the product Scotchgard®).

The thickness of the water repellent coating is advantageously less than 500 µm, such as less than 250 µm, preferably less than 150 µm, most preferably less than 100 µm, for example less than 50 µm, or even lesser, such as less than 20 µm or even less than 10 µm.

According to a more specific embodiment, substantially all the faces not covered with the hardened layer are provided with a water repellent coating.

According to an embodiment, the support has two substantially parallel faces (top and bottom faces or major faces, front and rear faces) connected the one to the other by lateral faces, whereby said lateral faces (bottom/top or front/rear faces) have a higher water permeability than the two substantially parallel faces. In said embodiment, the lateral faces of the support are provided with a water repellent coating. The water repellent coating on said lateral faces covers also at least a portion of the front/rear faces along their edges or at least a portion of the hardened layer adjacent to the edges of said front and rear faces. The water repellent coating can be carried out before and/or after providing the support with the hardened layer of the invention.

The Kit

The invention relates also to a kit for the preparation of inorganic binder composition according to the invention, said kit comprising:
a container of bag containing a water insoluble calcium silicate, and
one or more containers or bags containing compounds for preparing an acid alumina-silica phosphate solution, the pH of said solution measured at 20° C. being less than 1.5, advantageously less than 1, preferably less than 0.5.

The acid pH is advantageously obtained by using phosphoric acid or an acid mixture containing at least phosphoric acid. Preferably, substantially only phosphoric acid is used as mineral acid, most preferably as acid for lowering the pH of the solution to less than 2. The acid can be in a distinct container or can be used for the preparation of an acid solution containing solubilized alumina-silica phosphate, i.e. a ready to mix solution.

According to a preferred embodiment of the kit, the kit comprises:
a container of bag containing a water insoluble calcium silicate, silicon containing fibers with a length of less than 1000 µm, and possibly, but advantageously also silica flour with an average particle size of less than 500 µm, and
one or more containers or bags containing compounds for preparing an acid alumina-silica phosphate solution or containing an alumina-silica phosphate solution, the pH of said solution measured at 20° C. being less than 1.5, advantageously less than 1, preferably less than 0.5, in which the silica is solubilized.

It has been observed that the premix of water insoluble calcium silicate with silicon containing fibers with a length of less than 1000 µm was in a form enabling an easily and quick mixing with an acid alumina-silica phosphate solution.

The water insoluble calcium silicate, the silicon containing fibers, the silica flour used in the kit has advantageously one or more characteristics as disclosed here above in the binder and compositions of the invention.

The alumina-silica phosphate solution has advantageously a weight ratio $Al_2O_3/SiO_2$ ranging from 0.3:1 and 10:1, preferably from 0.6:1 and 6:1.

The kit advantageously further comprises a container with a composition containing a water repellent agent, advantageously in the form of a solution, preferably a ready to use solution. Such a composition is for example a water based solution or a solvent based solution containing a water repellent silane, preferably a fluoro silane.

The Process for the Preparation of a Binder/Composition of the Invention

A further subject matter of the invention is a process for the preparation of a binder/composition according to the invention, in which water insoluble calcium silicate particles are mixed with an acid alumina-silica solution at a temperature lower than 50° C., said acid alumina-silica solution having a pH less than 2, advantageously less than 1.5, for example comprised between 0.1 and 1.5, preferably comprised between 0.5 and 1.5.

The acid pH is advantageously obtained by using phosphoric acid or an acid mixture containing at least phosphoric acid. Preferably, substantially only phosphoric acid is used as mineral acid, most preferably as acid for lowering the pH of the solution to less than 2.

In the process of the invention, the alumina-silica phosphate solution has advantageously a ratio $Al_2O_3/SiO_2$ ranging from 0.3:1 and 10:1, preferably from 0.6:1 and 6:1.

In the process of the invention, a filler and/or a reinforced material is advantageously mixed with the calcium silicate particles before being mixed with the acid alumina-silica phosphate solution and/or a filler and/or a reinforced material is mixed to the mixture calcium silicate/alumina-silica phosphate solution, before or during its hardening.

Preferably, the hardening of the binder is carried out at a temperature comprised between 0° C. and 50° C., possibly under pressure.

The binder of the invention is prepared by using an acid alumina-silica phosphate solution, said solution is advantageously prepared by reacting aluminum oxide powder (size advantageously lower than 50 µm, preferably lower than 30 µm, for example from 5 to 25 µm) with a purity of more than 95%, preferably more than 99%, silica powder (size advantageously lower than 50 µm, preferably lower than 30 µm, for example from 10 to 25 µm) with a purity of more than 95%, preferably of more than 99%, and phosphoric acid as an aqueous phosphoric acid or in presence of an aqueous medium. The phosphoric acid has preferably a purity of more than 95%, most preferably of more than 99%. Phosphoric acid is available in various concentration. Preferably, the phosphoric acid will be a phosphoric aqueous solution with a phosphoric acid concentration of more than 75%, preferably of more than 85%. Preferably, the silica powder is first mixed with the phosphoric acid and then the alumina particles are added.

The acid alumina-silica phosphate solution contains possibly some other acids, such as organic acid, strong mineral acid, etc, however, in this case, the content of such acid will preferably be less than 10% of the phosphoric acid content of the solution.

Instead of using aluminum oxide, it is possible to use aluminum phosphate, aluminum hydroxide, etc. However, aluminum oxide is preferred.

Instead of using silica, preferably precipitated silica particles, it is possible to use waste material issuing from glass bottles.

Possibly the aqueous phosphoric acid solution contains other solvents, such as alcohol, etc.

When a foamed product is desired, more water or solvent will be used for decreasing as much as possible the viscosity.

The acid alumina silica phosphate solution has advantageously a pH lower than 2, preferably lower than 1.

It has been observed that when using silica particles for the preparation of the acid alumina phosphate solution with a pH lower than 2, most preferably lower than 1, the dissolution of alumina particles was improved. The presence of solubilized $SiO_2$ in the acid solution was also improving the formation of the bonds when adding the water insoluble calcium silicate particles. Even, if some calcium silicate particles are solubilized due to the low pH, some calcium silicate particles remains insoluble, due for example to the increase of pH to a value comprised between 3 and 6.

According to a specific embodiment, the process for the preparation of a composition according to the invention is a process, in which a binding mixture is prepared by mixing water insoluble calcium silicate particles with an acid alumina-silica phosphate solution at a temperature lower than 50° C., said acid alumina-silica phosphate solution comprising solubilized $SiO_2$ and having a pH less than 2, advantageously less than 1.5, preferably comprised between 0.5 and 1.5, said alumina-silica phosphate solution having a weight ratio $Al_2O_3/SiO_2$ ranging advantageously from 0.3:1 and 10:1, preferably from 0.6:1 and 6:1, in which silicon containing fibers with a length of less than 1000 μm are mixed with water insoluble calcium silicate particles, prior to or during the mixing of water insoluble silicate particles with an acid alumina-silica phosphate solution and/or in which silicon containing fibers with a length of less than 1000 μm are mixed with the binding mixture before its complete hardening.

Preferably, the binding mixture is first prepared and then the silicon containing fibers are added. Said addition is carried out when the binding mixture is still sufficiently liquid or pourable by gravity. Possibly before and/or during the addition of the fibers, water can be added for controlling the viscosity. Possibly the silicon containing fibers are prewetted before being added to the binding mixture.

According to an advantageous embodiment, silica flour is added to the water insoluble calcium silicate particles, prior to or during the mixing of water insoluble silicate particles with an acid alumina-silica phosphate solution and/or to the binding mixture before its complete hardening, said addition being carried out prior, during or after the addition of silicon containing fibers.

Preferably, the silicon containing fibers and the silica flour are premixed before being added to the acid alumina-silica phosphate solution or to the binding mixture.

According to a possible embodiment, the insoluble calcium silicate particles, the silicon containing fibers and the silica flour are premixed before being added to and mixed with the acid alumina-silica phosphate solution.

Advantageously, the weight ratio water insoluble calcium silicate particles/solubilized $SiO_2$ present in the alumina-silica phosphate solution is greater than 1, preferably greater than 1.5.

Preferably, the hardening of the binder/composition is carried out at a temperature comprised between 0° C. and 50° C., such as advantageously between 10 and 30° C.

The binder/composition is preferably hardened under pressure, such as under a pressure comprised between $2 \cdot 10^5$ Pa and $100 \cdot 10^5$ Pa, for example $5 \cdot 10^5$ Pa, $10^6$ Pa, $2 \cdot 10^6$ Pa, etc.

The amount of calcium silicate added to the acid silica alumina phosphate solution is advantageously such that the weight ratio calcium silicate/$SiO_2$ present in the acid solution is comprised between 1 and 5, advantageously comprised between 1.5 and 3.5.

Preferably, the amount of calcium silicate added to the acid silica alumina phosphate solution is such that the weight ratio calcium silicate/$SiO_2$ present in the acid solution is greater than 2.

According to a preferred embodiment, the silica used for the preparation of the acid silica alumina phosphate solution is precipitated silica.

The acid alumina-silica solution before its mixing with insoluble calcium silicate particles has advantageously a pH of less than 2, preferably less than 1.5, for example comprised between 0.1 and 1.5, preferably comprised between 0.5 and 1.5. The acid pH is advantageously obtained by using phosphoric acid or an acid mixture containing at least phosphoric acid. Preferably, substantially only phosphoric acid is used as mineral acid, most preferably as acid for lowering the pH of the solution to less than 2.

The calcium silicate particles are advantageously calcium meta silicate particles having a substantially acicular nature with a length/diameter ratio from 2/1 to 50/1, advantageously from 3/1 to 20/1.

The calcium meta silicate particles have preferably an average length from 10 μm to 10 mm, advantageously from 50 μm to 5 mm.

According to a preferred embodiment, the calcium silicate particles act as cross-linking sites for alumina-silica phosphate bonds. It seems also that the presence of insoluble calcium silicate particles catalyzes the formation of alumina-silica phosphate bonds.

In the process of the invention, the alumina-silica phosphate solution has advantageously a weight ratio $Al_2O_3/SiO_2$ ranging from 0.3:1 and 10:1, preferably from 0.6:1 and 6:1.

For example, the weight ratio calcium silicate particles/alumina-silica phosphate solution is comprised between 0.1 and 1.1, preferably from 0.3 and 0.9, most preferably between 0.4 and 0.7.

In the process of the invention, various filler and/or a reinforced material can be mixed with the calcium silicate particles before being mixed with the acid alumina-silica phosphate solution, and/or a filler and/or a reinforced material is mixed to the mixture calcium silicate/alumina-silica phosphate solution, before its or during its hardening.

Examples of fillers or reinforced materials which can be mixed with the binder before its preparation, during its preparation, before its hardening or during its hardening are:
waste materials, such as finely divided waste material, for example fuel ashes, fly ashes, buildings waste materials, etc.

flake-like materials such as mica, etc.,
silica sand, silica flour,
coloring agents or materials, such as inorganic coloring agents, pigments, etc.
cellulose and/or protein base fibers, such as natural fibers, flax, chip, straw, hemp, wool fibers, etc.
synthetic fibers, such as organic synthetic fibers, inorganic synthetic fibers, such as polyesters, polypropylene, glass and ceramic fibers, etc.
natural and synthetic organic base waste materials, such as saw dust, rice husk, straw and recycled organic waste,
natural fibers of mineral origin,
natural material, possibly treated (for example heat treated), such as perlite, vermiculite, etc.
etc.

Additives can be added to the binder/composition before its preparation, during its preparation, before its hardening or during its hardening, such additives are for example:
foaming agents, such as water peroxide, organic peroxide, etc.
viscosity regulating agent, such as superplasticizer
material for improving the impermeability or the water repulsion such as lignosulfonates and silica fume
etc.

Possibly, additives or fillers can be added during or after the hardening, for example for making a top coat.

The binder/composition of the invention is prepared by using an acid alumina-silica phosphate solution, said solution is advantageously prepared by reacting aluminum oxide powder (size advantageously lower than 50 µm, preferably lower than 30 µm, for example from 5 to 25 µm) with a purity of more than 95%, preferably more than 99%, silica powder (size advantageously lower than 50 µm, preferably lower than 30 µm, for example from 10 to 25 µm) with a purity of more than 95%, preferably of more than 99%, and phosphoric acid as an aqueous phosphoric acid or in presence of an aqueous medium. The phosphoric acid has preferably a purity of more than 95%, most preferably of more than 99%.

Phosphoric acid is available in various concentration. Preferably, the phosphoric acid will be a phosphoric aqueous solution with a phosphoric acid concentration of more than 75%, preferably of more than 85%. Preferably, the silica powder is first mixed with the phosphoric acid and then the alumina particles are added.

The acid alumina-silica phosphate solution contains possibly some other acids, such as organic acid, strong mineral acid, etc, however, in this case, the content of such acid will preferably be less than 10% of the phosphoric acid content of the solution.

Instead of using aluminum oxide, it is possible to use aluminum phosphate, aluminum hydroxide, etc. However, aluminum oxide is preferred.

Instead of using silica, preferably precipitated silica particles, it is possible to use waste material issuing from glass bottles.

Possibly the aqueous phosphoric acid solution contains other solvents, such as alcohol, etc.

When a foamed product is desired, more water or solvent will be used for decreasing as much as possible the viscosity. It is also possible to obtain a foaming product by applying the acid composition on a base containing support or on an alkaline support.

The acid alumina silica phosphate solution has advantageously a pH lower than 2, preferably lower than 1.

It has been observed that when using silica particles for the preparation of the acid alumina phosphate solution with a pH lower than 2, most preferably lower than 1, the dissolution of alumina particles was improved. The presence of solubilized $SiO_2$ in the acid solution was also improving the formation of the bonds when adding the water insoluble calcium silicate particles. Even, if some calcium silicate particles are solubilized due to the low pH, some calcium silicate particles remains insoluble, due for example to the increase of pH to a value comprised between 3 and 6.

EXAMPLES

Details and characteristics of the invention will appear from the description of the following examples.

In said examples, the following products have been used:
WATER: water with a low calcium/magnesium content (less than 100 ppm)
$SiO_2$: precipitated $SiO_2$ particles with an average size of 10-15 µm—purity of 99%
$Al_2O_3$: powder with an average particle size of 10-15 µm—purity of 99%
Phosphoric acid: aqueous solution containing 90% phosphoric acid
Calcium silicate: calcium meta silicate powder, water insoluble, acicular nature, length of 1 mm, diameter 100 µm.
Rice Husk fibers (RHF1): dried natural fibers (water content less than 2%) with an average (in weight) length of about 100 µm.
Rice Husk fibers (RHF2): dried natural fibers (water content less than 2%) with an average (in weight) length of about 200 µm.
Rice bran ceramic fiber (RBCF1): defatted bran mixed with phenolic resin, shaped in filament, dried and carbonized and burnt under nitrogen atmosphere at 800° C., the fibers having a length of about 100 µm.
Rice bran ceramic particles (RBC): defatted bran mixed with phenolic resin, powdered, dried and carbonized and burnt under nitrogen atmosphere at 800° C., the powder having an average particle size (average in weight) of about 50 µm.
Crystallized alumina silicate (CAS): not reactive with the phosphate solution, the particles having an average particle size of 50 µm (average in weight).
Silica Flour (SF): average (in weight) particle size of about 30 µm
Silica fume (Sf): average (in weight) particle size 50 µm.
Glass fiber (GF): glass fibers with a length of 50 µm to 250 µm, which have been treated with a water repellent agent (fluoro silane)

Examples of Binders

The binders have been prepared by adding $SiO_2$ particles to phosphoric acid. After dissolution of the $SiO_2$ particles, $Al_2O_3$ particles were added. An acid alumina silica phosphate aqueous solution was so prepared. The pH of said acid solution was then measured at 20° C. Possibly some water was added.

To said acid solution, calcium silicate particles was added. 5 to 10 minutes after the addition of calcium silicate particles, the binder can be hardened. Said hardening can be made at room temperature. In order to control the viscosity of the mixture, water can be added.

The following table gives the composition of the binders prepared.

|  | Binder | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| SiO$_2$ (g) | 35 | 16 | 21 | 13.6 | 46.2 | 60 | 182 | 130.8 | 97.2 | 233 |
| Al$_2$O$_3$ (g) | 24 | 23 | 13 | 50.8 | 30.8 | 60 | 136.5 | 21.8 | 58.1 | 46.6 |
| Phosphoric acid (g) | 141 | 141 | 167 | 123 | 135.6 | 180 | 182 | 87.4 | 184.7 | 350.4 |
| Molar Ratio SiO$_2$/P$_2$O$_5$ Of the solution | 0.43 | 0.2 | 0.2 | 0.19 | 0.59 | 0.58 | 1.73 | 2.62 | 0.92 | 1.15 |
| Calcium silicate (g) | 120 | 100 | 150 | 60 | 100 | 150 | 200 | 140 | 240 | 310 |
| Water (ml) | 80 | 40 |  |  | 25 | 60 | 118 | 21 | 71 | 65 |
| pH of the acid solution | 0.5 | 0.5 | 0.5 | 0.5 | 0.5 | 0.5 | 0.5 | 0.5 | 0.5 | 0.5 |
| pH of the solution after addition of the calcium silicate | 1 | 0.5 | 1 | 0.5 | 0.5 | 1.5 | 1 | 1 | 1.5 | 1.5 |
| Appearance of the mixture after the addition of the calcium silicate (LS, S-D, P)* | LS | LS | S-D | S-D | P | LS | LS | S-D | P | P |

*LS = Liquid suspension/S-D = Semi-dry/P = Pasty

In the process of the invention, the amount of calcium silicate added to the acid silica alumina phosphate solution is such that the weight ratio calcium silicate/SiO$_2$ present in the acid solution is advantageously greater than 1, preferably greater than 1.5, most preferably greater than 2, for example comprised between 1 and 5, advantageously comprised between 1.5 and 3.5.

The binders 3 to 5 and 8 to 10, after their preparation, are mixed with water so as to have a more liquid appearance, whereby the addition of fibers and other particles is more adequate.

Examples of Compositions of the Invention

The binder n°2 which is liquid after its preparation was mixed with various additives and/or filler.

The following tables gives the different additives and fillers used, expressed in part by weight, the binder being expressed as dry matter (without water).

TABLE 1

|  | Product n° | | | | | | | |
| --- | --- | --- | --- | --- | --- | --- | --- | --- |
|  | 1 | 2 | 3 | 4 | 5 | 6 | 7 | 8 |
| Binder (dry matter, part by weight) | 1 | 1 | 1 | 1 | 1 | 1 | 1 | 1 |
| RHF1 | 0.1 | 0.1 |  |  | 0.5 |  |  |  |
| RHF2 |  | 0.1 |  |  |  |  |  |  |
| RBCF1 |  |  | 0.2 |  |  | 0.4 | 0.4 | 0.4 |
| RBC |  |  |  | 0.3 |  |  |  |  |
| CAS |  |  |  |  | 0.2 |  |  |  |
| SF | 0.02 | 0.02 | 0.05 | 0.05 | 0.1 | 0.1 | 0.1 | 0.1 |
| Sf |  |  |  |  |  | 0.1 | 0.2 | 0.2 |
| GF |  |  |  |  |  | 0.5 | 1 |  |

TABLE 2

|  | Product n° | | | | | |
| --- | --- | --- | --- | --- | --- | --- |
|  | 9 | 10 | 11 | 12 | 13 | 14 |
| Binder (part by volume) | 1 | 1 | 1 | 1 | 1 | 1 |
| Additive (Part by | H$_2$O$_2$ 0.13 | Silica Fume | Aluminum powder | Super Plasticizer | Ligno-Sulfonate | Quartz 0.54 |

TABLE 2-continued

|  | Product n° | | | | | |
|---|---|---|---|---|---|---|
|  | 9 | 10 | 11 | 12 | 13 | 14 |
| volume) |  | 0.42 | 0.12 | 0.15 | 0.13 |  |
| Filler | Vermiculite | Straw | Fly ash | Chip | Flax | Silica |
| (part by volume) | 0.33 | 3 parts | 0.52 | 1.22 | Fiber 0.75 | Flour 0.25 |
| Appearance of the product | Foam, low density | Low density | Foam Low density | Low density | Low density | Heavy density |

For the preparation of said compositions, water can be added for controlling the viscosity of the composition, said viscosity being preferably maintained as low as possible during the mixing step.

To the compositions of Table 1, one or more further additives or fillers can be added.

The following table gives possible additives and fillers which can be added to the compositions of the table 1. Said addition is carried out when the composition is sufficient liquid. Possibly some water is added before the addition and/or during the addition of said additives and fillers.

| Examples of possible additive and filler added to one volume of a composition with a solid content of 25% and 50% by weight | | | | | | |
|---|---|---|---|---|---|---|
| Additive (Part by volume) | H₂O₂ 0.13 | Silica Fume 0.42 | Aluminum powder 0.12 | Super Plasticizer 0.15 | Ligno-Sulfonate 0.13 | Quartz 0.54 |
| Filler (part by volume) | Vermiculite 0.33 | Straw 3 parts | Fly ash 0.52 | Chip 1.22 | Flax Fiber 0.75 | Silica Flower 0.25 |
| Appearance of the product | Foam, low density | Low density | Foam Low density | Low density | Low density | Heavy density |

The composition comprising one or more inert fillers are preferably prepared by premixing at least partly the inert fillers with the calcium silicate, before using said calcium silicate for the preparation of the binder. The premix was thus mixed with the acid silica alumina phosphate solution.

Examples of Coating Operation

A wood board with a thickness of 20 mm has been cut in samples with a size of 200 mm×200 mm. One sample was used as control sample. Said control sample was dipped in water at 20° C. for 72 hours. The water absorption of the control sample was 46% (i.e. the weight of the wood board was increased by 46% due to the dipping in water, with respect to the weight of the dry board before its dipping—dry meaning a water content of less than 10% by weight in the board), while the swelling of the product was 37% (i.e. the volume of the sample was increased by 37% due to the dipping with respect to the volume of the dry board—dry meaning a water content of less than 10% by weight), The samples have been submitted respectively to the following treatment.

Sample 1

Composition 7 of Table 1 has been used just after its preparation for coating the upper face of sample. The coating after drying had a thickness of 2 mm.

After its complete curing, the sample was dipped in water (20° C.) for 72 hours. The water absorption was about 25% with a swelling of about 8%.

Sample 2

Sample 2 was prepared as disclosed for sample 1, except that after coating the front face, the rear face was also coated with a mm thick coating (composition 7 of Table 1).

After its complete curing of the two coating layer, the sample was dipped in water (20° C.) for 72 hours. The water absorption was about 20% with a swelling of about 6%.

Sample 3

Sample 3 was prepared as disclosed for example 2, except that thereafter the four lateral faces of the sample were also provided with a coating layer (composition 7), said layer having a thickness of about 1-2 mm.

After complete curing or hardening of the coating layer, the sample was dipped in water (20° C.) for 72 hours. The water absorption was about 14% with a swelling of about 2%.

Sample 4

Sample 4 was prepared as disclosed in example 2, except that the lateral faces were treated with a water repellent agent (scotchgard™ 3M).

After the complete curing of the two coating layer and of the water repellent agent, the sample was dipped in water (20° C.) for 72 hours. The water absorption was about 14% with a swelling of about 0%.

Sample 5

Sample 4 was prepared as disclosed in example 1, except that the lateral faces were treated with a water repellent agent (scotchgard™ 3M).

After the complete curing of the two coating layer and of the water repellent agent, the sample was dipped in water (20° C.) for 72 hours. The water absorption was about 15% with a swelling of about 0-2%.

Sample 6

Sample 6 was prepared as disclosed in example 2, except that before the coating of the rear and front faces with the composition 7 of Table 1, the lateral faces as well as the edges of the front and rear faces were treated with a water repellent agent.

After the complete curing of the two coating layer and of the water repellent agent, the sample was dipped in water (20° C.) for 72 hours. The water absorption was about 14% with a swelling of about 0-2%.

Sample 7

Sample 7 was prepared as disclosed for sample 3, except that thereafter the hardened layer was further coated with a water repellent agent (scotchgard).

After the complete curing of the two coating layer and of the water repellent agent, the sample was dipped in water (20° C.) for 72 hours. The water absorption was about 15% with a swelling of about 0-2%.

Sample 8

Sample 8 was prepared as disclosed for sample 3, except that before applying the hardened layer of composition 7, all the faces of the sample were coated with a water repellent agent (scotchgard).

After the complete curing of the two coating layer and of the water repellent agent, the sample was dipped in water (20° C.) for 72 hours. The water absorption was about 15% with a swelling of about 0-2%.

The water absorption and swelling tests was repeated with oriented strand board. The conclusions of the samples 1 to 8 were maintained.

The composition 6 was applied on a face of a polyethylene web of 200 g/m$^2$. After hardening of the composition, a flexible film layer was obtained.

The composition 8 was poured so as to produce samples for being tested according to the standards BS EN ISO 1716 and ASTMD2015. The maximum amount of heat that the sample can release under highly idealized conditions was determined in an oxygen bomb calorimeter using adiabatic and isothermal methods. This test determines the maximum total heat release of the material after complete combustion, i.e. the difference between the gross heat of combustion and the residual heat after 2 hours of combustion. A gross heat of combustion of 85 KJ/Kg was determined, meaning that the product is considered as an extremely non combustible materials (M0).

Mechanical tests were also performed on the sample according to the NBN EN 196-1 standards. It was determined that the product had the following properties modulus of rupture 15.5 Mpa, compressive strength 30-40 Mpa, young's modulus 2200-4500 Mpa.

The water capillary porosity was of about 13-14% (ASTM C948-81).

What I claim is:

1. A composition comprising at least: an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1, and silicon containing fibers with a length of less than 1000 μm, the weight content of silicon containing fibers with a length of less than 1000 μm in the composition after its hardening and after removal of the possible free water being of at least 0.5%.

2. The composition of claim 1, which comprises silicon containing fibers with an average (in weight) length of less than 500 μm, the weight content of silicon containing fibers with an average length of less than 500 μm in the composition after its hardening and after removal of the possible free water being of at least 0.5%.

3. The composition of claim 1, which comprises silicon containing fibers with an average (in weight) length of more than 10 μm.

4. The composition of claim 1, which comprises silicon containing fibers with an average (in weight) length of more than 20 μm.

5. The composition of claim 1, which comprises silicon containing fibers with an average (in weight) length comprised between 25 μm and 300 μm.

6. The composition of claim 1, which comprises silicon containing fibers with an average (in weight) length between 50 μm and 250 μm.

7. The composition of claim 1, in which the silicon containing fibers with a length of less than 1000 μm are substantially not reactive with the binder.

8. The composition of claim 1, in which the silicon containing fibers with a length of less than 500 μm are substantially not reactive with the binder.

9. The composition of claim 1, in which the silicon containing fibers with a length of less than 1000 μm are not reactive with the binder.

10. The composition of claim 1, in which the silicon containing fibers with a length of less than 500 μm are not reactive with the binder.

11. The composition of claim 1, which, after hardening and removal of free water, comprises from 1% up to 85% by weight, silicon containing fibers with a length of less than 1000 μm, which are substantially not reactive with the binder.

12. The composition of claim 1, which, after hardening and removal of free water, comprises from 1% up to 85% by weight, silicon containing fibers with a length of less than 1000 μm, which are not reactive with the binder.

13. The composition of claim 1, which, after hardening and removal of free water, comprises from 2% up to 75% by weight, silicon containing fibers with a length of less than 1000 μm, which are not reactive with the binder.

14. The composition of claim 1, which, after hardening and removal of free water, comprises from 1% up to 85% by weight, silicon containing fibers with a length of less than 500 μm, which are not reactive with the binder.

15. The composition of claim 1, which, after hardening and removal of free water, comprises from 2% up to 75% by weight, silicon containing fibers with a length of less than 500 μm, which are not reactive with the binder.

16. The composition of claim 1, which, after hardening and removal of free water, comprises from 20% up to 65% by weight silicon containing fibers with a length of less than 1000 μm which are substantially not reactive with the binder.

17. The composition of claim 1, which, after hardening and removal of free water, comprises from 30% up to 60% by weight silicon containing fibers with a length of less than 500 μm, which are not reactive with the binder.

18. The composition of claim 1, which further comprises silica flour with a particle size of less than 500 μm, the weight content of silica flour in the composition after its hardening and after removal of the possible free water being of at least 0.5%.

19. The composition of claim 1, which further comprises silica flour with an average (in weight) particle size comprised between 2 and 100 μm, the weight content of silica flour in the composition after its hardening and after removal of the possible free water being comprised between 1 and 10%.

20. The composition of claim 1, which further comprises silica flour with an average (in weight) particle size comprised between 2 and 100 μm, the weight content of silica flour in the composition after its hardening and after removal of the possible free water being comprised between 2 and 8%.

21. The composition of claim 1, which further comprises silica flour with an average (in weight) particle size comprised between 5 and 60 μm, the weight content of silica flour in the composition after its hardening and after removal of the possible free water being comprised between 2 and 8%.

22. The composition of claim 1, which further comprises silica flour with an average (in weight) particle size comprised between 10 and 50 μm the weight content of silica flour in the composition after its hardening and after removal of the possible free water being comprised between 2 and 8%.

23. The composition of claim 1, which further comprises crystallized alumina silicate particles which are substantially not reactive with the binder and which have an average (in weight) particle size comprised between 5 and 100 μm, the weight content of non reactive crystallized alumina silicate in the composition after its hardening and after removal of the possible free water being comprised between 1 and 10%.

24. The composition of claim 1, which further comprises crystallized alumina silicate particles which are substantially not reactive with the binder and which have an average (in weight) particle size comprised between 5 and 100 μm, the weight content of non reactive crystallized alumina silicate in the composition after its hardening and after removal of the possible free water being comprised between 2 and 8%.

25. The composition of claim 1, in which the calcium silicate sites of the inorganic binder act as cross-linking sites for the alumina-silica phosphate bonds with a weight ratio $Al_2O_3/SiO_2$ ranging from 0.6:1 and 6:1.

26. The composition of claim 1, in which the weight ratio calcium silicate site/$SiO_2$ present in the alumina-silica phosphate bonds of the inorganic binder is greater than 1.

27. The composition of claim 1, in which the weight ratio calcium silicate site/$SiO_2$ present in the alumina-silica phosphate bonds of the inorganic binder is greater than 1.5.

28. The composition of claim 1, in which the calcium silicate sites of the inorganic binder are calcium meta silicate sites having a substantially acicular nature with a length/diameter ratio from 2/1 to 50/1.

29. The composition of claim 1, in which the calcium silicate sites of the inorganic binder are calcium meta silicate sites having a substantially acicular nature with a length/diameter ratio from 3/1 to 20/1.

30. The composition of claim 28, in which the calcium meta silicate sites has an average length from 10 μm to 10 mm.

31. The composition of claim 29, in which the calcium meta silicate sites has an average length from 50 μm to 5 mm.

32. The composition of claim 1, in which the weight ratio calcium silicate sites/alumina-silica phosphate bonds of the inorganic binder is comprised between 0.1 and 1.1.

33. The composition of claim 1, in which the weight ratio calcium silicate sites/alumina-silica phosphate bonds of the inorganic binder is comprised between 0.3 and 0.9.

34. The composition of claim 1, in which the weight ratio calcium silicate sites/alumina-silica phosphate bonds of the inorganic binder is comprised between 0.4 and 0.7.

35. A process for the preparation of a composition according to claim 1 comprising at least an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1, and silicon-containing fibers with a length of less than 1000 μm, the weight content of silicon containing fibers with a length of less than 1000 μm in the composition after its hardening and after removal of the possible free water being of at least 0.5%, in which said inorganic binder is prepared by mixing insoluble calcium silicate particles with an acid alumina-silica phosphate solution at a temperature lower than 50° C., said acid alumina-silica phosphate solution comprising solubilized $SiO_2$ and having a pH of less than 2, said alumina-silica phosphate solution having a weight ratio $Al_2O_3/SiO_2$ ranging from 0.3:1 and 10:1.

36. The process of claim 35, in which water insoluble calcium silicate particles are mixed with an acid alumina-silica phosphate solution at a temperature lower than 50° C. said acid alumina-silica phosphate solution comprising solubilized $SiO_2$ and having a pH of less than 1.5, said alumina-silica phosphate solution having a weight ratio $Al_2O_3/SiO_2$ ranging from 0.6:1 and 6:1.

37. The process of claim 35, in which water insoluble calcium silicate particles are mixed with an acid alumina-silica phosphate solution at a temperature lower than 50° C., said acid alumina-silica phosphate solution comprising solubilized $SiO_2$ and having a pH comprised between 0.5 and 1.5, said alumina-silica phosphate solution having a weight ratio $Al_2O_3/SiO_2$ ranging from 0.6:1 and 6:1.

38. The process of claim 35, in which the weight ratio water insoluble calcium silicate particles/solubilized $SiO_2$ present in the alumina-silica phosphate solution is greater than 1.

39. The process of claim 35, in which the weight ratio water insoluble calcium silicate particles/solubilized $SiO_2$ present in the alumina-silica phosphate solution is greater than 1.5.

40. The process of claim 35, in which the calcium silicate particles are calcium meta silicate particles having a substantially acicular nature with a length/diameter ratio from 2/1 to 50/1.

41. The process of claim 35, in which the calcium silicate particles are calcium meta silicate particles having a substantially acicular nature with a length/diameter ratio from 3/1 to 20/1.

42. The process of claim 40, in which the calcium meta silicate particles have an average length from 10 μm to 10 mm.

43. The process of claim 42, in which the calcium meta silicate particles have an average length from 50 μm to 5 mm.

44. The process of claim 35, in which the calcium silicate particles act as cross-linking sites for alumina-silica phosphate bonds.

45. The process of claim 35, in which the weight ratio calcium silicate particles/alumina-silica phosphate solution is comprised between 0.1 and 1.1.

46. The process of claim 35, in which a filler is mixed with the calcium silicate particles before being mixed with the acid alumina-silica phosphate solution.

47. The process of claim 35, in which a filler is mixed to the mixture calcium silicate/alumina-silica phosphate solution, before its hardening.

48. The process of claim 35, in which the hardening of the binder is carried out at a temperature comprised between 0° C. and 50° C.

49. The process of claim 35, in which the binder is hardened under pressure.

50. The process of claim 35, in which the amount of calcium silicate added to the acid silica alumina phosphate solution is such that the weight ratio calcium silicate/$SiO_2$ present in the acid solution is comprised between 1 and 5.

51. The process of claim 35, in which the amount of calcium silicate added to the acid silica alumina phosphate solution is such that the weight ratio calcium silicate/$SiO_2$ present in the acid solution is comprised between 1.5 and 3.5.

52. The process of claim 35, in which the amount of calcium silicate added to the acid silica alumina phosphate solution is such that the weight ratio calcium silicate/$SiO_2$ present in the acid solution is greater than 2.

53. The process of claim 35, in which the acid silica alumina phosphate solution is prepared by mixing a silica-alumina mixture with an acid consisting substantially only of phosphoric acid.

54. The process of claim 53, in which further silica and alumina is added to the formed acid solution.

55. The process of claim 35, in which the acid silica alumina phosphate solution is prepared by mixing silica particles with an acid consisting substantially only of phosphoric acid, and by mixing thereafter to the silica containing solution alumina particles.

56. The process of claim 35, in which the acid silica alumina phosphate solution is prepared by mixing alumina particles with an acid consisting substantially only of phosphoric acid, and by mixing thereafter to the alumina containing solution silica particles.

57. The process of claim 35, in which the acid silica alumina phosphate solution is prepared at least by mixing precipitated silica with an acid solution with a pH lower than 1.5.

58. The process of claim 35, in which inert silicon containing fibers with a length of less than 1000 μm are mixed to the mixture calcium silicate/alumina-silica phosphate solution, before its complete hardening.

59. The process of claim 35, in which inert silicon containing fibers with a length of less than 1000 μm are mixed to the alumina-silica phosphate solution before the adding of water insoluble calcium silicate particles.

60. The process of claim 35, in which inert silicon containing fibers with a length of less than 1000 μm and water insoluble calcium silicate particles are added together to the alumina-silica phosphate solution.

61. A process for the manufacture of a product comprising a support provided with at least a hardened layer comprising an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1, in which at least partly a face of the support is contacted with a composition comprising at least:
  an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1,
  silicon containing fibers with a length of less than 1000 μm, the weight content of silicon containing fibers with a length of less than 1000 μm in the composition after its hardening and after removal of the possible free water being of at least 0.5%, and
  a further filler, and
in which the composition is hardened on said support.

62. The process of claim 61, in which the composition contacting the support comprises silicon containing fibers with a length of less than 100 μm, the weight content of silicon containing fibers with a length of less than 1000 μm in the composition after its hardening and after removal of the possible free water being of at least 0.5%.

63. The process of claim 61, in which at least a portion of a face of the support not contacted with the composition is provided with a water repellent coating.

64. The process of claim 63, in which the water repellent coating is a fluoro silicon coating.

65. The process of claim 61, in which at least one face of the support intended to be not contacted with the composition is provided with a water repellent coating.

66. The process of claim 65, in which at least partly a face of the support is provided with a water repellent coating prior contacting at least partly a face of the support with the composition.

67. The process of claim 61, in which at least a portion of a face adjacent to a portion of a face provided with a hardened layer are provided with a water repellent coating.

68. The composition of claim 1, which further comprises silica flour with a particle size of less comprised between 2 and 400 μm, the weight content of silica flour in the composition after its hardening and after removal of the possible free water being of at least 0.5%.

69. A product comprising at least a hardened layer prepared by hardening a composition comprising at least:
  an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1;
  silicon-containing fibers with a length of less than 1000 μm, the weight content of silicon containing fibers with a length of less than 1000 μm in the composition after its hardening and after removal of the possible free water being of at least 0.5%; and
  a further filler,
  said hardened layer comprising:
    an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1;
    silicon-containing fibers with a length of less than 1000 μm; and
    a further filler.

70. The product of claim 69, in which the hardened layer covers at least partly a face of a support element.

71. The product of claim 69, in which the hardened layer covers at least partly a face of a support comprising a core which can be subjected to a water swelling, and in which at least partly a face not covered by hardened layer is provided with a water repellent coating.

72. The product of claim 71, in which the water repellent coating is a silicon containing water repellent coating.

73. The product of claim 72, in which the water repellent coating is a fluoro silicon coating.

74. The product of claim 69, in which the hardened layer covers at least partly a face of a support comprising a core which can be subjected to a water swelling, and in which the faces not with a hardened layer are provided with a water repellent coating.

75. The product of claim 74, in which the water repellent coating is a silicon containing water repellent coating.

76. The product of claim 69, in which the hardened layer covers at least partly a face of a support comprising a core which can be subjected to a water swelling, said face being provided with a water repellent coating.

77. The product of claim 69, in which the hardened layer comprises at least: an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1, and silicon containing fibers with a length of less than 1000 µm, the weight content of silicon containing fibers with a length of less than 1000 µm in the composition after its hardening and after removal of the possible free water being of at least 0.5%.

78. The product of claim 77, which comprises silicon containing fibers with an average (in weight) length of less than 500 µm, the weight content of silicon containing fibers with an average length of less than 500 µm in the composition after its hardening and after removal of the possible free water being of at least 0.5%.

79. The product of claim 69, in which the hardened layer comprises silicon containing fibers with an average (in weight) length of more than 10 µm.

80. The product of claim 69, in which the hardened layer comprises silicon containing fibers with an average (in weight) length of more than 20 µm.

81. The product of claim 69, in which the hardened layer comprises silicon containing fibers with an average (in weight) length comprised between 25 µm and 300 µm.

82. The product of claim 69, in which the hardened layer comprises silicon containing fibers with an average (in weight) length between 50 µm and 250 µm.

83. The product of claim 69, in which the hardened layer comprises silicon containing fibers with a length of less than 1000 µm which are substantially not reactive with the binder.

84. The product of claim 69, in which the hardened layer comprises silicon containing fibers with a length of less than 500 µm which are substantially not reactive with the binder.

85. The product of claim 69, in which the hardened layer comprises silicon containing fibers with a length of less than 1000 µm, which are not reactive with the binder.

86. The product of claim 69, in which the hardened layer comprises silicon containing fibers with a length of less than 500 µm which are not reactive with the binder.

87. The product of claim 69, in which, after hardening and removal of free water, the hardened layer comprises from 1% up to 85% by weight, silicon containing fibers with a length of less than 1000 µm, which are substantially not reactive with the binder.

88. The product of claim 69, in which, after hardening and removal of free water, the hardened layer comprises from 1% up to 85% by weight, silicon containing fibers with a length of less than 1000 µm, which are not reactive with the binder.

89. The product of claim 69, in which, after hardening and removal of free water, the hardened layer comprises from 2% up to 75% by weight, silicon containing fibers with a length of less than 1000 µm, which are not reactive with the binder.

90. The product of claim 69, in which, after hardening and removal of free water, the hardened layer comprises from 1% up to 85% by weight, silicon containing fibers with a length of less than 500 µm, which are not reactive with the binder.

91. The product of claim 69, in which, after hardening and removal of free water, the hardened layer comprises from 2% up to 75% by weight, silicon containing fibers with a length of less than 500 µm, which are not reactive with the binder.

92. The product of claim 69, in which, after hardening and removal of free water, the hardened layer comprises from 20% up to 65% by weight silicon containing fibers with a length of less than 1000 µm which are substantially not reactive with the binder.

93. The product of claim 69, in which, after hardening and removal of free water, the hardened layer comprises from 30% up to 60% by weight silicon containing fibers with a length of less than 500 µm, which are not reactive with the binder.

94. The product of claim 69, in which the hardened layer further comprises silica flour with a particle size of less than 500 µm, the weight content of silica flour in the composition after its hardening and after removal of the possible free water being of at least 0.5%.

95. The product of claim 69, in which the hardened layer further comprises silica flour with a particle size of less comprised between 2 and 400 µm, the weight content of silica flour in the composition after its hardening and after removal of the possible free water being of at least 0.5%.

96. The product of claim 69, in which the hardened layer further comprises silica flour with an average (in weight) particle size comprised between 2 and 100 µm the weight content of silica flour in the composition after its hardening and after removal of the possible free water being comprised between 1 and 10%.

97. The product of claim 69, in which the hardened layer further comprises silica flour with an average (in weight) particle size comprised between 2 and 100 µm, the weight content of silica flour in the composition after its hardening and after removal of the possible free water being comprised between 2 and 8%.

98. The product of claim 69, in which the hardened layer further comprises silica flour with an average (in weight) particle size comprised between 5 and 60 µm, the weight content of silica flour in the composition after its hardening and after removal of the possible free water being comprised between 2 and 8%.

99. The product of claim 69, in which the hardened layer further comprises silica flour with an average (in weight) particle size comprised between 10 and 50 µm the weight content of silica flour in the composition after its hardening and after removal of the possible free water being comprised between 2 and 8%.

100. The product of claim 69, in which the hardened layer further comprises crystallized alumina silicate particles which are substantially not reactive with the binder and which have an average (in weight) particle size comprised between 5 and 100 µm, the weight content of non reactive crystallized alumina silicate in the composition after its hardening and after removal of the possible free water being comprised between 1 and 10%.

101. The product of claim 69, in which the hardened layer further comprises crystallized alumina silicate particles which are substantially not reactive with the binder and which have an average (in weight) particle size comprised between 5 and 100 µm, the weight content of non reactive crystallized alumina silicate in the composition after its hardening and after removal of the possible free water being comprised between 2 and 8%.

102. The product of claim 69, in which the calcium silicate sites of the inorganic binder act as cross-linking sites for the alumina-silica phosphate bonds with a weight ratio $Al_2O_3/SiO_2$ ranging from 0.6:1 and 6:1.

103. The product of claim 69, in which the weight ratio calcium silicate site/$SiO_2$ present in the alumina-silica phosphate bonds of the inorganic binder is greater than 1.

104. The product of claim 69, in which the weight ratio calcium silicate site/$SiO_2$ present in the alumina-silica phosphate bonds of the inorganic binder is greater than 1.5.

105. The product of claim 69, in which the calcium silicate sites of the inorganic binder are calcium meta silicate sites having a substantially acicular nature with a length/diameter ratio from 2/1 to 50/1.

106. The product of claim 69, in which the calcium silicate sites of the inorganic binder are calcium meta silicate sites having a substantially acicular nature with a length/diameter ratio from 3/1 to 20/1.

107. The product of claim 105, in which the calcium meta silicate sites has an average length from 10 μm to 10 mm.

108. The product of claim 106, in which the calcium meta silicate sites has an average length from 50 μm to 5 mm.

109. The product of claim 69, in which the weight ratio calcium silicate sites/alumina-silica phosphate bonds of the inorganic binder is comprised between 0.1 and 1.1.

110. The product of claim 69, in which the weight ratio calcium silicate sites/alumina-silica phosphate bonds of the inorganic binder is comprised between 0.3 and 0.9.

111. The product of claim 69, in which the weight ratio calcium silicate sites/alumina-silica phosphate bonds of the inorganic binder is comprised between 0.4 and 0.7.

* * * * *